United States Patent
Park et al.

(10) Patent No.: US 8,406,557 B2
(45) Date of Patent: Mar. 26, 2013

(54) METHOD AND APPARATUS FOR CORRECTING LENS SHADING

(75) Inventors: Min-Kyu Park, Seoul (KR); Hee-Chan Park, Seoul (KR); Jin-Ho Kim, Seoul (KR); Ji-Hye Kim, Goyang-si (KR); Sung-Dae Cho, Yongin-si (KR); Moon-Gi Kang, Seoul (KR); Chang-Won Kim, Seoul (KR); Hyun-Mook Oh, Seoul (KR)

(73) Assignees: Samsung Electronics Co., Ltd (KR); Industry-Academic Cooperation Foundation Yonsei University (KR)

( * ) Notice: Subject to any disclaimer, the term of this patent is extended or adjusted under 35 U.S.C. 154(b) by 199 days.

(21) Appl. No.: 12/832,631

(22) Filed: Jul. 8, 2010

(65) Prior Publication Data
US 2011/0007969 A1 Jan. 13, 2011

(30) Foreign Application Priority Data
Jul. 8, 2009 (KR) .................. 10-2009-0062181

(51) Int. Cl.
*G06K 9/40* (2006.01)
*H04N 9/64* (2006.01)
*H04N 5/217* (2011.01)
(52) U.S. Cl. .............. 382/274; 348/241; 348/251
(58) Field of Classification Search .......... 382/167, 382/254, 274–275; 348/251, 241, 222.1, 348/335, 3.09, 3.1, 229.1, 230.1, 235, 256, 348/297, 362, 363, 364, 365, 234, 254, 255
See application file for complete search history.

(56) References Cited

U.S. PATENT DOCUMENTS

| | | | | |
|---|---|---|---|---|
| 6,862,373 | B2 * | 3/2005 | Enomoto | 382/263 |
| 7,355,639 | B2 * | 4/2008 | Lee | 348/251 |
| 7,391,450 | B2 * | 6/2008 | Pinto et al. | 348/251 |
| 7,453,502 | B2 * | 11/2008 | Schweng | 348/241 |
| 7,548,661 | B2 * | 6/2009 | Lin et al. | 382/274 |
| 7,634,152 | B2 * | 12/2009 | Silverstein | 382/275 |
| 7,834,921 | B1 * | 11/2010 | Pinto et al. | 348/251 |

(Continued)

FOREIGN PATENT DOCUMENTS
WO  WO 2005/066893  7/2005
WO  WO 2006/019209  2/2006

OTHER PUBLICATIONS

Zheng Y, Lin S, Kambhamettu C, Yu J, Kang SB, Single-image vignetting correction,IEEE Transactions on Pattern Analysis and Machine Intelligence, Vol. 31, No. 12, Dec. 2009.*

(Continued)

*Primary Examiner* — Andrae S Allison
(74) *Attorney, Agent, or Firm* — The Farrell Law Firm, P.C.

(57) ABSTRACT

A lens shading correction method and apparatus are provided for removing vignetting occurring in digital images due to lens shading. A white image captured by an image pickup device and an image pickup unit is separated into reference white images corresponding to color channels. A vignetting center having a maximum light intensity is estimated in each of the reference white images. Multiple reference segments on each of the reference white images are defined. A lens shading correction value corresponding to each pixel constituting the reference segments are calculated using a corresponding light intensity. A lens shading correction function corresponding to each reference segment is derived using a corresponding lens shading correction value. Vignetting of a general image received in a general image processing mode is removed, using the derived multiple lens shading correction functions.

16 Claims, 6 Drawing Sheets

U.S. PATENT DOCUMENTS

| | | |
|---|---|---|
| 7,859,589 B2 * | 12/2010 | Yabe .............................. 348/364 |
| 2004/0257454 A1 * | 12/2004 | Pinto et al. ................. 348/222.1 |
| 2005/0099507 A1 * | 5/2005 | Lee ............................ 348/224.1 |
| 2005/0179793 A1 * | 8/2005 | Schweng ....................... 348/251 |
| 2006/0204128 A1 * | 9/2006 | Silverstein .................... 382/275 |
| 2007/0285552 A1 | 12/2007 | Kim |
| 2008/0043117 A1 | 2/2008 | Kim et al. |
| 2009/0040371 A1 * | 2/2009 | Hunter ....................... 348/425.1 |

OTHER PUBLICATIONS

Wonpil Yu; , "Practical anti-vignetting methods for digital cameras," Consumer Electronics, IEEE Transactions on , vol. 50, No. 4, pp. 975-983, Nov. 2004.*

* cited by examiner

METHOD AND APPARATUS FOR CORRECTING LENS SHADING

PRIORITY

This application claims priority under 35 U.S.C. §119(a) to a Korean Patent Application filed in the Korean Intellectual Property Office on Jul. 8, 2009 and assigned Serial No. 10-2009-0062181, the contents of which are incorporated herein by reference.

BACKGROUND OF THE INVENTION

1. Field of the Invention

The present invention relates generally to digital image processing, and more particularly, to a lens shading correction method and apparatus for removing vignetting that occurs in digital images due to lens shading.

2. Description of the Related Art

In an image pickup apparatus with a lens system and an image pickup unit, shading (or non-uniformity of sensitivity) occurs in a picked-up image due to a lack of ambient light, which is caused by the lens system.

The removal of lens shading may be performed by a variety of methods, which may be divided into two typical method types. A first method type divides an image into multiple blocks and stores weights of the respective blocks in a memory. A second method type models an image subjected to lens shading correction in a polynomial function and uses it as a correction function.

The lens shading correction method type using weights of blocks may be divided into two different schemes. A first scheme divides an image into multiple square blocks as shown in FIG. 1, stores weights of the respective blocks in a memory, and uses the stored weights during lens shading correction. Related information is described in US Patent Publication No. 2007/285552, entitled "Lens Shading Correction Device and Method in Image Sensor." A second scheme finds the center in an image as shown in FIG. 2, stores weights associated with distances from the center in a memory, and uses the stored weights during lens shading correction. This scheme is described in US Patent Publication No. 2008/0043117.

The lens shading correction method using a lens shading correction function is commonly used in an Image Signal Processor (ISP) because it uses less of the memory. When horizontal and vertical coordinates of pixels constituting an image are defined as (x,y), polynomials used for lens shading correction may be expressed as Equations (1) and (2) below. Equation (1) represents a function in which a lens shading correction function is applied to an image, and Equation (2) exhibits a substantial lens shading correction function. In Equations (1) and (2), if horizontal and vertical coordinates of an image are defined as (x,y), white(x,y) denotes a white image acquired by photographing a white plane on which a constant intensity of light is incident, and MAX means the maximum light intensity in the white image. f(x,y) is a lens shading correction function, and $a_{ij}$ is a lens shading correction coefficient which is a coefficient of a polynomial function. In Equation (2), $a_{ij}$ denotes the $i^{th}$ and $j^{th}$-order coefficients of x and y, and k1 and k2 denote the highest orders of x and y, respectively.

$$\hat{f}(x, y) = \min \left| \frac{MAX}{white(x, y)} - f(x, y) \right| \quad (1)$$

$$f(x, y) = \sum_{i=0}^{k1} \sum_{j=0}^{k2} a_{ij} x^i y^j \quad (2)$$

In the lens shading correction method using weights of blocks, as size of the number of blocks increases, the performance increases. Thus, if weights for all pixels are stored, lens shading correction will show the best performance. However, since increased memory use raises the chip prices, the number of weights that can be stored cannot be unlimited, which thereby limits the available number of blocks. Even though an image is divided into multiple blocks according to a predetermined memory size, interpolation should be performed between the blocks, disadvantageously requiring additional hardware functions.

In the lens shading correction method using a lens shading correction function, the use of a higher-order polynomial ensures more accurate lens shading correction. However, the number of bits used for multiplication increases with the order of the polynomial, making it difficult to realize the hardware and making it impossible to accurately reflect local characteristics of the lens shading.

SUMMARY OF THE INVENTION

The present invention has been made to address at least the above problems and/or disadvantages and to provide at least the advantages described below. Accordingly, an aspect of the present invention provides a lens shading correction method and apparatus having fewer computations and a high lens shading correction rate.

Another aspect of the present invention provides a lens shading correction method and apparatus that is easy to implement in hardware and that can reduce the use of hardware.

According to one aspect of the present invention, a method is provided for correcting lens shading in an image processing apparatus. A white image captured by an image pickup device and an image pickup unit is separated into reference white images corresponding to color channels. A vignetting center having a maximum light intensity is estimated in each of the reference white images. Multiple reference segments are defined on each of the reference white images. Each of the reference segments has one endpoint at the vignetting center and another endpoint on a border of the corresponding reference white image. A lens shading correction value corresponding to each pixel constituting the reference segments is calculated using a corresponding light intensity. A lens shading correction function corresponding to each reference segment is derived using a corresponding lens shading correction value. Vignetting of a general image received in a general image processing mode is removed, using the derived multiple lens shading correction functions.

According to another aspect of the present invention, an apparatus is provided for correcting lens shading in an image processing apparatus. The apparatus includes an image pickup device, an image pickup unit, and a lens shading corrector for separating a white image captured by the image pickup device and the image pickup unit into reference white images corresponding to color channels. The lens shading corrector also estimates a vignetting center having a maximum light intensity in each of the reference white images, and defines multiple reference segments on each of the reference white images. Each of the reference segments has one endpoint at the vignetting center and another endpoint on a border of the corresponding reference white image. The lens shading corrector further calculates a lens shading correction value corresponding to each pixel constituting the reference segments using a corresponding light intensity, derives a lens shading correction function corresponding to each reference segment using a corresponding lens shading correction value, and removes vignetting of a general image received in a general image processing mode, using the derived multiple lens shading correction functions.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
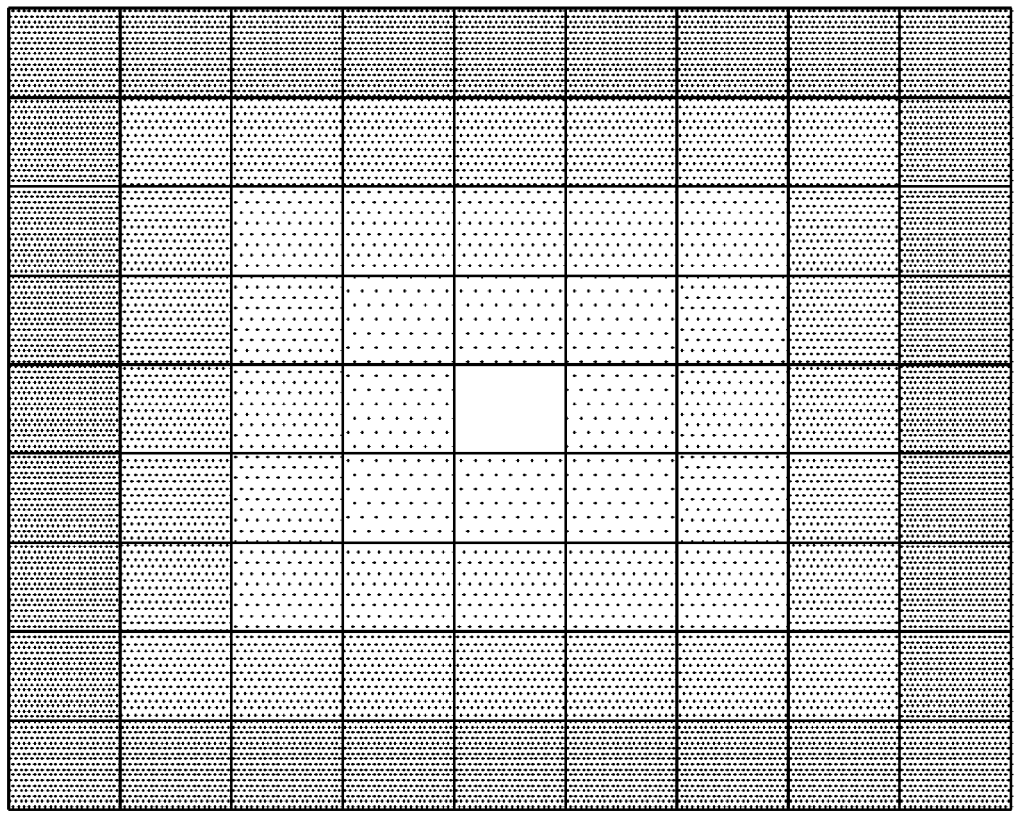
FIGS. 1 and 2 are diagrams showing conventional lens shading correction methods.
Figure 2:
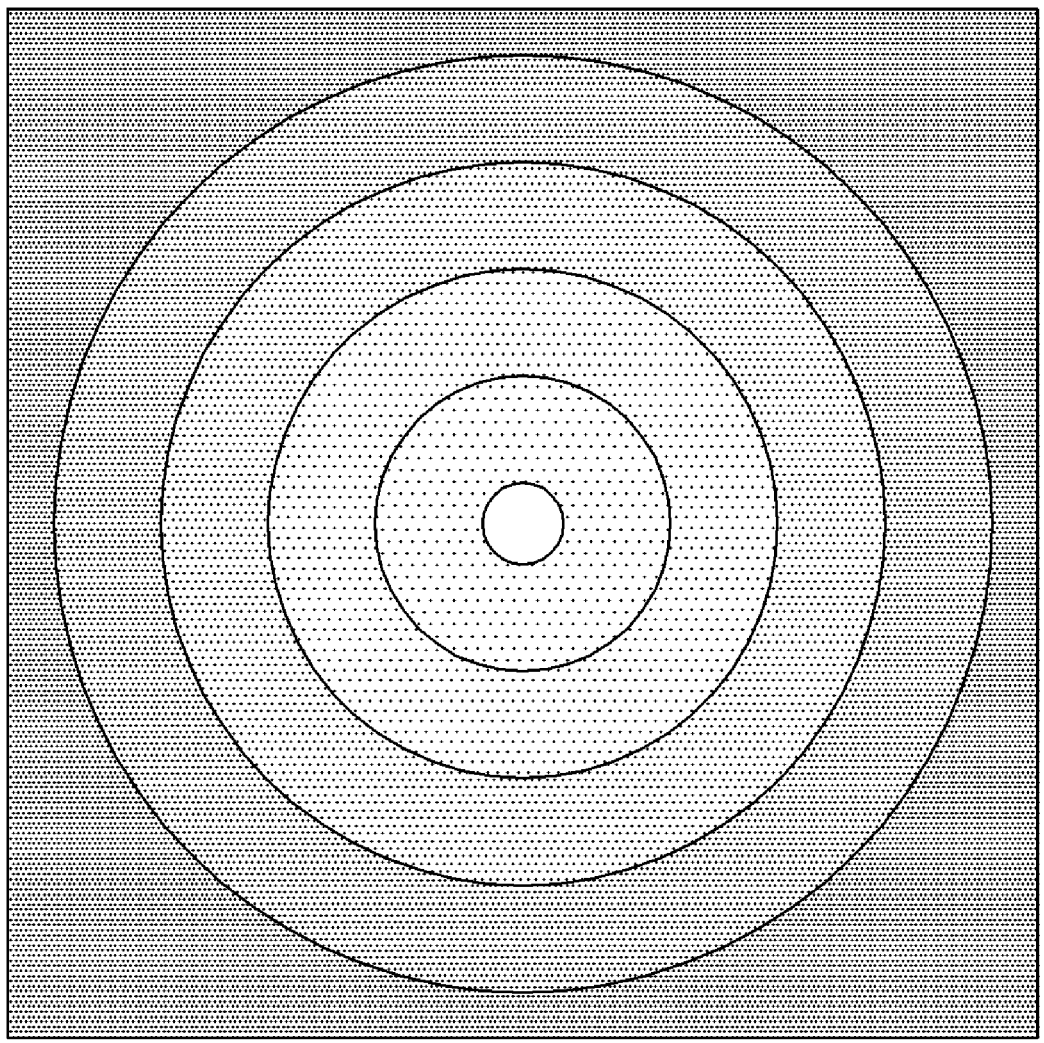

Embodiments of the present invention are described in detail with reference to the accompanying drawings. It should be noted that throughout the drawings, the same or similar reference numerals may refer to the same or similar elements, features and structures. Detailed descriptions of constructions or processes known in the art may be omitted to avoid obscuring the subject matter of the present invention.

Figure 3:
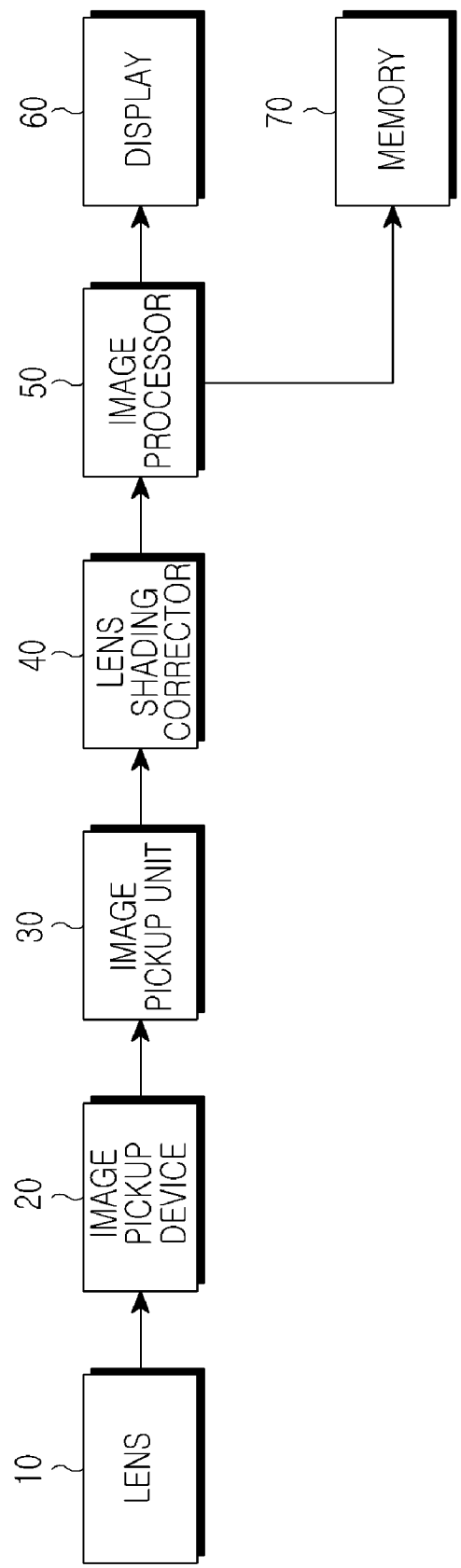
FIG. 3 is a diagram illustrating a structure of an image processing apparatus, according to an embodiment of the present invention.

A structure of an image processing apparatus, to which an embodiment of the present is applied, is shown in FIG. 3. The image processing apparatus includes a lens 10, an image pickup device 20, and an image pickup unit 30 having a Correlated Double Sampling (CDS) circuit, an Automatic Gain Control (AGC) circuit and an Analog-to-Digital (A/D) converter. The image processing apparatus also includes a lens shading corrector 40, an image processor 50, a display 60, and a memory 70.

The lens 10 is used to allow light, or an image of a subject, to be incident on the image pickup device 20.

The image pickup device 20 has photoelectric conversion elements including, for example, Charge Coupled Devices (CCD) elements or Complementary Metal Oxide Semiconductor (C-MOS) elements, arranged in a two-dimensional manner. A primary-color filter (not shown), on which Red (R), Green (G) and Blue (B) are arranged in a mosaic pattern, is mounted on an anterior surface of the image pickup device 20. Hence, the image pickup device 20 generates an image pickup signal (or image pickup charges) by photoelectric-converting an optical image of a subject, which has been incident on the lens 10 and the primary-color filter. The image pickup device 20 outputs the generated image pickup signal to the image pickup unit 30 in a raster scanning manner. A complementary color filter, on which Ye, Cy, Mg and G are arranged in a mosaic pattern, may be used as the primary-color filter.

The image pickup unit 30 performs noise removal on the image pickup signal received from the image pickup device 20 using the CDS circuit, carries out gain control on the noise-removed signal using the AGC circuit, converts the gain-controlled analog signal into a digital signal by means of the A/D converter, and outputs the digital signal to the lens shading corrector 40.

The lens shading corrector 40 corrects a lack of ambient light received on an image pickup surface, which is caused by lens shading, in the image provided from the image pickup unit 30 according to an embodiment of the present invention. The lens shading corrector 40 then provides the corrected image to the image processor 50.

The image processor 50 performs signal processing including gamma processing, color separation processing and YUV conversion at a ratio of 4:2:2, on the image provided from the lens shading corrector 40. The image processor 50 generates image data consisting of luminance signal data and chroma signal data. The image processor 50 provides the generated image data to the display 60 to display the corresponding image, or stores the created image data in the memory 70.

The display 60 includes, for example, a Liquid Crystal Display (LCD), and displays a subject's image provided from the image processor 50. The memory 70 may include, for example, a magnetic disc, an optical disc, a magneto-optical disc, or a semiconductor memory, and stores image data provided from the image processor 50.

A process of correcting lens shading by the lens shading corrector 40 in the above-described image processing apparatus, according to an embodiment of the present invention, is described with reference to FIGS. 4 to 8.

In an embodiment of the present invention, to estimate lens shading correction functions, multiple segments are set as reference segments. Each of the multiple segments has one endpoint situated at the center of a reference image and another endpoint situated at any one point on each respective side constituting the reference image. Shading correction functions for the respective reference segments are estimated using light intensities of pixels constituting the respective reference segments. Lens shading is removed through interpolation using shading correction functions of associated reference segments for pixels existing between the reference segments.

A white image may be used as the reference image and the multiple reference segments may be specified such that images separated by the reference segments are similar in size if possible. In an embodiment of the present invention, 8 reference segments are used, including 4 reference segments that each separated by 90 degrees, and another 4 reference segments that exist between the respective reference segments, bisecting sizes of the images divided by the 4 reference segments. The white image is an image acquired by photographing a uniform white plane, and it is preferable to use a relatively uniform light source in photographing for generation of a white image.

Accordingly, an embodiment of the present invention includes a process of generating correction coefficients of shading correction functions for lens shading removal using a white image, and a process of deriving shading correction functions using the generated correction coefficients, and then removing lens shading of an input image. Equation (2) is used as the shading correction function.

Figure 4:
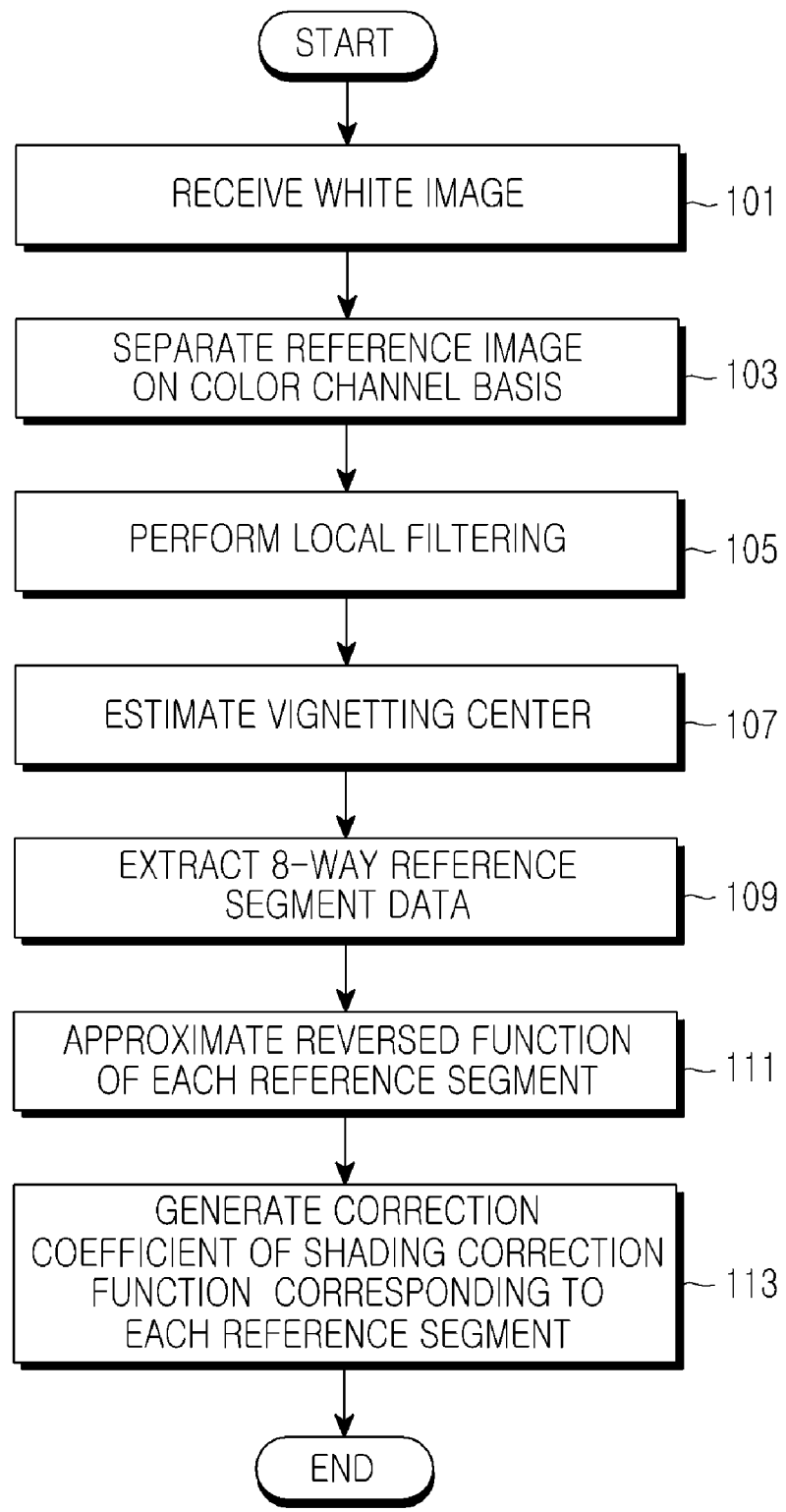
FIG. 4 is a diagram illustrating a process of deriving lens shading correction functions, according to an embodiment of the present invention.

A process of determining correction coefficients of shading correction functions includes removing (or filtering) noises that are included in a white image due to lens shading, estimating the center of the white image, extracting line data for multiple reference segments heading to different directions from the center, performing inverse approximation on the respective reference segments using the extracted line data, and deriving shading correction coefficients corresponding to the respective reference segments. An operation of the lens shading corrector 40 according to the above process is shown in FIG. 4.

Figure 7:
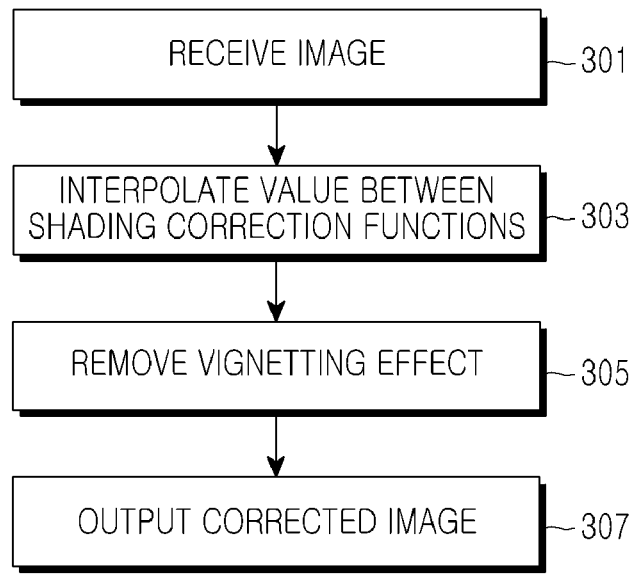
FIG. 7 is a diagram illustrating a lens shading correction process, according to an embodiment of the present invention.

A process of removing lens shading of an input image using the correction coefficients generated in the above process includes deriving shading correction functions using correction coefficients, and interpolating values between the respective shading correction functions. An operation of the lens shading corrector 40 according to the above process is shown in FIG. 7.

The process of generating correction coefficients for lens shading removal according to an embodiment of the present invention will be described with reference to FIGS. 4, 5 and 6. The process of correcting lens shading for an actual input image using shading correction functions will be described with reference to FIGS. 7 and 8.

Since the shading correction functions are functions used to remove vignetting existing in image data during image processing, it is preferable to derive and store the functions in a separate operation mode, and not in a general image processing mode. Hence, in an embodiment of the present invention, the image processing apparatus uses an image captured in a shading correction function derive mode as a reference image for calculating correction coefficients.

Because it is preferable to use a white image as the reference image for calculating correction coefficients according to an embodiment of the present invention, it is preferable for the user to take a picture of a uniform white plane under a relatively uniform light source, for extraction of correction functions.

In the shading correction function derive mode, the lens shading corrector 40 in the image processing apparatus operates as in FIG. 4. Referring to FIG. 4, the lens shading corrector 40 treats an image input from the image pickup unit 30 as a reference image for calculating correction coefficients in step 101, and separates the reference image on a color channel basis in step 103. In an embodiment of the present invention, the reference image is a white image.

The reference image, or white image, received from the image pickup unit 30 is an image before it undergoes color interpolation. It is preferable to separate the reference image into R, G and B channel images before proceeding with the process, to remove lens shading on a color channel basis.

If the image pickup unit device 20 includes a Bayer pattern, which is the commonly used Color Filter Array (CFA), the G channel may have pixel values for two kinds of channels: Green-red (Gr) and Green-blue (Gb) channels. Compared with other channels, this channel has twice the number of pixels, so it is preferable to extract different shading correction functions for the Gr and the Gb channels, respectively, during channel separation. Hence, channel separation is also achieved for each of the Gr, Gb, R and B channels.

The reference image may include non-uniform parts due to noises occurring in the image pickup device 20. In addition, non-uniform parts caused by small refractions or reflections on the image pickup surface may exist in the white image. Therefore, in step 105, the lens shading corrector 40 removes noises by performing local filtering on each of the reference images separated on a channel basis, thereby increasing estimation performance for lens shading correction functions.

In step 107, the lens shading corrector 40 estimates the vignetting center for each of the reference images of the respective channels. The term "vignetting center" refers to the brightest part in the reference image, or the white image, having the maximum light intensity.

In an embodiment of the present invention, to estimate lens shading correction functions, multiple segments, each having one endpoint situated at the center of the reference image and another endpoint situated at any one point on a border of the reference image, are set as reference segments so that the reference image may be as similar to the original white image as possible, thereby improving the lens shading correction performance.

It is important to measure the correct vignetting center in the white image. Measuring the vignetting center finds the optical axis of the lens, and in most cases, the vignetting center is not exactly coincident with the center of the image, or the center of the image pickup surface. Accordingly, in an embodiment of the present invention, the accuracy of estimating the vignetting center may be increased through iteration.

According to an embodiment of the present invention, the lens shading corrector 40 sets the center of the image pickup surface as the first vignetting center candidate, and then finds the light-intensity center of a horizontal segment passing by the center of the image pickup surface. The term "light-intensity center" refers to coordinates of the pixel with the maximum light intensity among the pixels constituting the horizontal segment. The lens shading corrector 40 sets the light-intensity center of the horizontal segment component as a new vignetting center candidate, and finds a light-intensity center of a vertical segment passing by the vignetting center candidate. The lens shading corrector 40 sets the light-intensity center of the vertical segment as a new vignetting center candidate, and re-finds the light-intensity center of the horizontal segment passing by the light-intensity center of the vertical segment. The above process may be iterated.

In most cases, the image data being input to the lens shading corrector 40 suffers from fluctuation. As shown in FIG. 6, the light-intensity center is estimated by seeking an average of a predetermined section where pixels with high light intensities are distributed.

Figure 6:
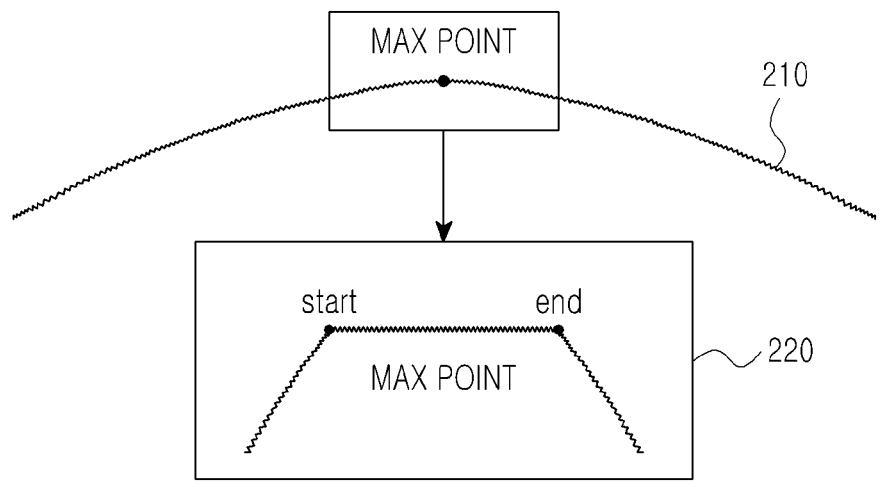
FIG. 6 is a diagram illustrating a process of estimating the vignetting center, according to an embodiment of the present invention.

In FIG. 6, a curve 210 represents light intensities of pixels constituting an arbitrary segment passing by a vignetting center candidate. Since the light intensities of pixels do not constantly increase or decrease as shown by the curve 210, the lens shading corrector 40 specifies a center section 220 in which the maximum light intensity is included. The lens shading corrector 40 then calculates the middle point between a start point and an end point of the center section 220, making it possible to estimate a relatively accurate light-intensity center and thus to estimate a relatively accurate vignetting center.

Referring back to FIG. 4, upon completion of the vignetting center estimation in each of the reference images associated with the channels, the lens shading corrector 40 defines 8-way reference segments directed to the exterior of the reference image from the vignetting center, estimated from each the reference images associated with the channels, in step 109. The positions of the defined reference segments are stored in the memory 70, and may be applied in the same way in the future to general images during lens shading correction.

Figure 5:
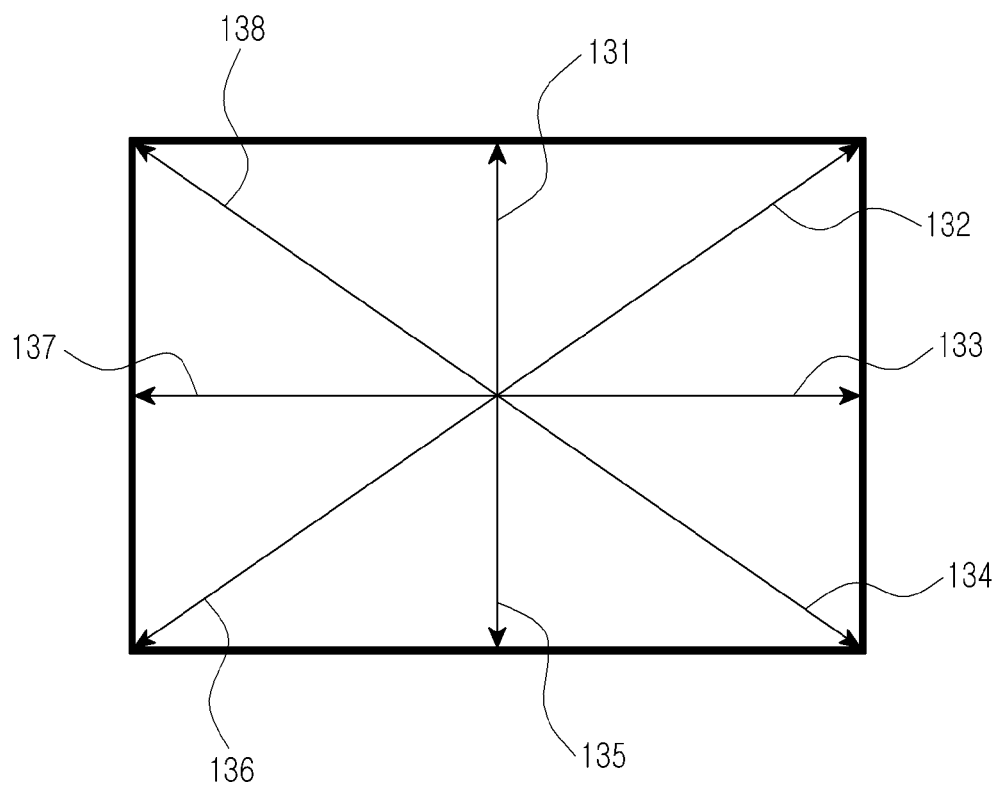
FIG. 5 is a diagram illustrating reference segments, according to an embodiment of the present invention.

An example of such reference segments is shown in FIG. 5. In an embodiment of the present invention, 8 reference segments are set as shown in FIG. 5. The 8 reference segments include a first reference segment 131, a second reference segment 132, a third reference segment 133, a fourth reference segment 134, a fifth reference segment 135, a sixth reference segment 136, a seventh reference segment 137, and an eighth reference segment 138, and the respective reference segments 131, 132, 133, 134, 135, 136, 137 and 138 are defined such that areas divided by the reference segments are similar in size if possible.

The lens shading corrector 40 then extracts light intensities of pixels constituting each of the reference segments associated with the respective channels. In steps 111 and 113, the lens shading corrector 40 divides the light intensity of the vignetting center by the extracted light intensities. The calculated values become values of the lens shading correction functions because the lens shading phenomenon can be removed by multiplying reversed functions of the functions associated with the reference segments. In accordance with an embodiment of the present invention, values of the lens shading correction functions associated with the reference segments may be calculated by Equation (3) below.

$$Inv(x, y) = \frac{Max}{white(x, y)} \quad (3)$$

where Inv(x,y) denotes a value of a lens shading correction function in (x,y) coordinates of a reference image, Max denotes a light intensity of a vignetting center, or a maximum light intensity in the pertinent reference image, and white(x, y) represents a light intensity of a pixel corresponding to (x,y) coordinates in the reference image, i.e., a light intensity of a pixel corresponding to (x,y) coordinates of a pertinent reference segment. The coordinates of the vignetting center are $(x_0, y_0)$.

If values of the lens shading correction functions are calculated on a reference segment basis using Equation (3), correction coefficients of the shading correction functions shown in Equation (2) may be derived by approximating the calculated values in an $n^{th}$-order function using Least Square.

However, if the image pickup device 20 includes the Bayer pattern, a slight difference in light intensity occurs between G or Gr located in the same row as R, and G or Gb located in the same row as B. These effects are defined as cross talk, which occurs due to the structure of the image pickup device 20. Therefore, a difference occurs even between the maximum light intensities for the areas with flat light intensities in the Gr reference image and the Gb reference image. If the respective maximum light intensities are used without correction of the difference, an undesired pattern may appear even in the flat section when the difference is large. To prevent this, an average of the maximum light intensities of the Gr reference image and the Gb reference image, defined by Equation (4) below, is used to derive lens shading correction functions from the Or reference image and the Gb reference image.

$$Max\_G = \frac{Max\_Gr + Max\_Gb}{2} \quad (4)$$

where Max_G denotes a corrected maximum light intensity, Max_Gr denotes a maximum light intensity in the Gr reference image, and Max_Gb denotes a maximum light intensity in the Gb reference image.

Thereafter, the correction coefficients of the lens shading correction functions for reference images associated with the R, Gr, Gb and B channels are acquired, completing a pre-processing process for lens shading removal.

Lens shading may be removed from the lens shading correction functions Inv_R(x,y), Inv_Gr(x,y), Inv_Gb(x,y) and Inv_B(x,y) that have been acquired from the R, Gr, Gb and B colors, respectively, in Equations (1) and (2). Specifically, lens shading is removed from correction functions for the same colors as those of the pertinent pixels. However, the correction functions are not defined for all pixels, but 8 correction functions are defined for each of the colors. Thus, for the undefined parts, distances between a point subjected to correction and two reference segments closest to the point are calculated, and an applied ratio of the shading correction functions corresponding to the two reference segments for this point is determined in proportion to the distances.

Referring to FIG. 7, if an input image is applied to the lens shading corrector 40 in step 301 as photographing occurs in the image processing apparatus in a normal image processing mode, the lens shading corrector 40 performs interpolation on the pixels existing between shading correction functions in step 303, removes the vignetting effects in step 305, and outputs the vignetting effect-removed image in step 307.

Figure 8:
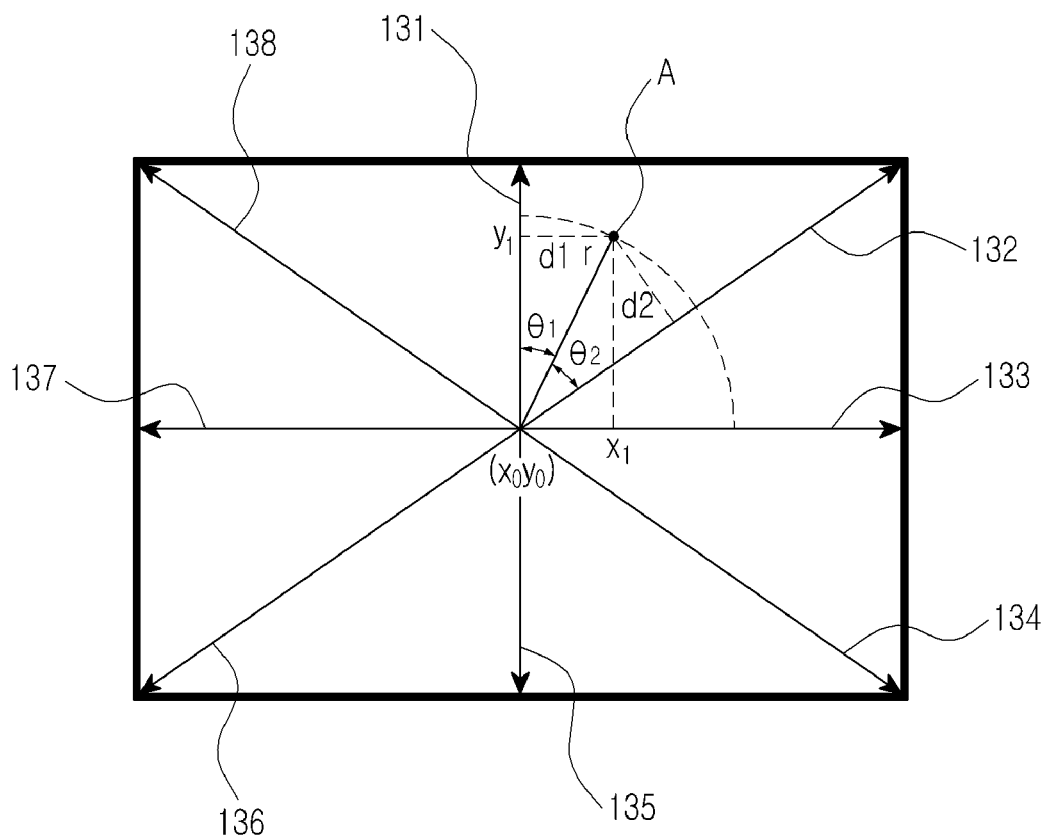
FIG. 8 is a diagram illustrating interpolation in lens shading correction, according to an embodiment of the present invention.

For example, a process of interpolating the point of a pixel A that is apart from the vignetting center by r and located between the first reference segment 131 and the second reference segment 132 is shown in FIG. 8.

Coordinates of the pixel A are $(x_1, y_1)$, an angle formed between the first reference segment 131 and a segment A connecting the coordinates $(x_0, y_0)$ of the vignetting center to the pixel A is $\theta_1$, and an angle formed between the segment A and the second reference segment 132 is $\theta_2$. In the interpolation process for the pixel A, the value r and the angles $\theta_1$ and $\theta_2$ are needed, which are calculated by Equations (5), (6) and (7), respectively.

$$r = \sqrt{(x_1 - x_0)^2 + (y_1 - y_0)^2} \quad (5)$$

$$\theta_1 = \tan^{-1} \frac{y_1 - y_0}{x_1 - x_0} \quad (6)$$

$$\theta_2 = \tan^{-1} \frac{x_1 - x_0}{y_1 - y_0} \quad (7)$$

Here, arc-tangent may be calculated using Taylor series.

When lens shading correction functions corresponding to the 8-way reference segments 131, 132, 133, 134, 135, 136, 137 and 138 are calculated using Equation (2) and Least Square, a lens shading correction function $f_1$ corresponding to the first reference segment 131 can be written as Equation (8) below.

$$f_1 = \sum_{i=0}^{k1} \sum_{j=0}^{k2} a_{ij} x^i y^j = \sum_{k} a_{1k} r^k \quad (8)$$

Lens shading correction functions corresponding to the second to eighth reference segments 132 to 138 can be expressed in a similar manner.

With the values calculated by Equations (6) and (7), a distance d1 between the pixel A and the first reference segment 131 and a distance d2 between the pixel A and the second reference segment 132 can be calculated by Equations (9) and (10) below.

$$d1 = r \sin \theta_1 \qquad (9)$$

$$d2 = r \sin \theta_2 \qquad (10)$$

With d1 and d2, a correction value for the pixel A can be determined by Equation (11) below, in which d1 and d2 determine proportional relationships between the pixel A and the shading correction functions corresponding to the first and second reference segments 131 and 132, respectively.

$$f_A(r) = \frac{d2 \cdot f_1(r) + d1 \cdot f_2(r)}{d2 + d1} \qquad (11)$$

If a lens shading correction value of the point corresponding to the pixel A is determined, the lens shading corrector 40 removes the vignetting effects at the point using the determined lens shading correction value.

As is apparent from the foregoing description, by removing the lens shading as described above, it is possible to efficiently improve lens shading performance and prevent sensitivity reduction with less computation.

The lens shading correction method and apparatus provided by embodiments of the present invention can ensure a high lens shading correction rate with less computation. In addition, the proposed lens shading correction method and apparatus is easy to implement in hardware, and can reduce the use of the hardware and improve the sensitivity of lens shading correction.

While the invention has been shown and described with reference to certain embodiments thereof, it will be understood by those skilled in the art that various changes in form and detail may be made therein without departing from the spirit and scope of the invention as defined by the appended claims and their equivalents. For example, the number of lens shading correction functions derived for each of the colors may be 4.

What is claimed is:

1. A method for correcting lens shading in an image processing apparatus, comprising the steps of
    separating a white image captured by an image pickup device and an image pickup unit into reference white images corresponding to color channels;
    estimating a vignetting center having a maximum light intensity in each of the reference white images;
    defining multiple reference segments on each of the reference white images, wherein each of the reference segments has one endpoint at the vignetting center and another endpoint on a border of the corresponding reference white image;
    calculating a lens shading correction value corresponding to each pixel constituting the reference segments using a corresponding light intensity, and deriving a lens shading correction function corresponding to each reference segment using a corresponding calculated lens shading correction value; and
    removing vignetting of a general image received in a general image processing mode, using the derived multiple lens shading correction functions,
    wherein estimating a vignetting center comprises:
    (1) setting a center of an image pickup surface as a center candidate of a reference white image;
    (2) determining as a light-intensity center a part of the image pickup surface where a pixel has a maximum light intensity among pixels constituting a horizontal segment passing through the center candidate in the reference white image, and re-setting the light-intensity center as the center candidate;
    (3) re-determining as the light-intensity center a part of the image pickup surface where a pixel has a maximum light intensity among pixels constituting a vertical segment passing through the re-set center candidate in the reference white image, and re-setting the light-intensity center as the center candidate; and
    (4) determining a last center candidate as the vignetting center by iterating steps (2) and (3).

2. The method of claim 1, wherein a lens shading correction function associated with a color of each pixel of the general image is used for removing vignetting of the general image;
    wherein removing vignetting of the general image comprises:
    calculating distances between an arbitrary pixel located between the multiple reference segments in the image, and two reference segments closest to the arbitrary pixel, determining an applied ratio of shading correction functions corresponding to the two reference segments for the arbitrary pixel in proportion to the distances, and determining a correction value for the arbitrary pixel, thereby performing lens shading correction.

3. The method of claim 2, wherein an applied ratio $f_A(r)$ of shading correction functions corresponding to the two reference segments is determined by:

$$f_A(r) = \frac{d2 \cdot f_1(r) + d1 \cdot f_2(r)}{d2 + d1}$$

where $f_1(r)$ denotes a first reference segment out of the two reference segments, $f_2(r)$ denotes a second reference segment, d1 denotes a distance between the first reference segment and the arbitrary pixel, and d2 denotes a distance between the second reference segment and the arbitrary pixel.

4. The method of claim 2, wherein the color channels comprise a Green (G) channel, a Red (R) channel, a Blue (B) channel, a Green-red (Gr) channel, and a Green-blue (Gb) channel.

5. The method of claim 1, wherein a halfway point between a start point and an end point of a center section specified to include a pixel having the maximum light intensity is determined as the light-intensity center.

6. The method of claim 1, wherein the multiple reference segments are defined such that areas divided by the multiple reference segments are similar in size.

7. The method of claim 1, wherein deriving a lens shading correction function comprises:
    detecting each light intensity of each pixel constituting an arbitrary reference segment;
    determining a value obtained by dividing a light intensity of the vignetting center of a reference white image in which the arbitrary reference segment is defined, by the detected each light intensity as each lens shading correction value corresponding to the each pixel; and
    calculating a correction coefficient of a lens shading correction function using the each lens shading correction value corresponding to each pixel constituting the arbitrary reference segment, and deriving a lens shading correction function f(x,y) corresponding to the arbitrary reference segment, as:

$$f(x, y) = \sum_{i=0}^{k1} \sum_{j=0}^{k2} a_{ij} x^i y^j$$

where $a_{ij}$ denotes the correction coefficient, and k1 and k2 denote the highest orders of x and y, respectively.

8. The method of claim 7, wherein the light intensity of the vignetting center, which is used to calculate lens shading correction values of pixels corresponding to reference segments of reference white images corresponding to the Gr channel and the Gb channel is an average of a light intensity of a vignetting center in a reference white image of the Gr channel and a light intensity of a vignetting center in a reference white image of the Gb channel.

9. An apparatus for correcting lens shading in an image processing apparatus, comprising:
   an image pickup device;
   an image pickup unit; and
   a lens shading corrector for separating a white image captured by the image pickup device and the image pickup unit into reference white images corresponding to color channels, estimating a vignetting center having a maximum light intensity in each of the reference white images, defining multiple reference segments on each of the reference white images, each of the reference segments having one endpoint at the vignetting center and another endpoint on a border of the corresponding reference white image, calculating a lens shading correction value corresponding to each pixel constituting each of the reference segments using a corresponding light intensity, deriving a lens shading correction function corresponding to each reference segment using a corresponding calculated lens shading correction value, and removing vignetting of a general image received in a general image processing mode, using the derived multiple lens shading correction functions,
   wherein to estimate the vignetting center, the lens shading corrector includes (1) setting a center of an image pickup surface as a center candidate of a reference white image, (2) determining as a light-intensity center a part of the image pickup surface where a pixel has a maximum light intensity among pixels constituting a horizontal segment passing through the center candidate in the reference white image, and re-setting the light-intensity center as the center candidate, (3) re-determining as the light-intensity center a part of the image pickup surface where a pixel has a maximum light intensity among pixels constituting a vertical segment passing by the re-set center candidate, and re-setting the light-intensity center as the center candidate in the reference white image, and (4) determining a last center candidate as the vignetting center by iterating steps (2) and (3).

10. The apparatus of claim 9, wherein the lens shading corrector uses a lens shading correction function associated with a color of each pixel of the general image in removing vignetting of the general image, calculates distances between an arbitrary pixel existing between the multiple reference segments in the image, and two reference segments closest to the arbitrary pixel, determines an applied ratio of shading correction functions corresponding to the two reference segments for the arbitrary pixel in proportion to the distances, and determines a correction value for the arbitrary pixel, thereby performing lens shading correction.

11. The apparatus of claim 10, wherein an applied ratio fA(r) of shading correction functions corresponding to the two reference segments is determined by:

$$f_A(r) = \frac{d2 \cdot f_1(r) + d1 \cdot f_2(r)}{d2 + d1}$$

where $f_1(r)$ denotes a first reference segment out of the two reference segments, $f_2(r)$ denotes a second reference segment, d1 denotes a distance between the first reference segment and the arbitrary pixel, and d2 denotes a distance between the second reference segment and the arbitrary pixel.

12. The apparatus of claim 10, wherein the color channels comprise a Green (G) channel, a Red (R) channel, a Blue (B) channel, a Green-red (Gr) channel, and a Green-blue (Gb) channel.

13. The apparatus of 9, wherein a halfway point between a start point and an end point of a center section specified to include a pixel having the maximum light intensity is determined as the light-intensity center.

14. The apparatus of claim 9, wherein the multiple reference segments are defined such that areas divided by the multiple reference segments are similar in size.

15. The apparatus of claim 9, wherein to derive the lens shading correction functions, the lens shading corrector detects each light intensity of each pixel constituting an arbitrary reference segment, determines a value obtained by dividing a light intensity of the vignetting center of a reference white image in which the arbitrary reference segment is defined, by the detected each light intensity as each lens shading correction value corresponding to the each pixel, calculates a correction coefficient of a lens shading correction function using the lens shading correction value corresponding to each pixel constituting the arbitrary reference segment, and derives a lens shading correction function f(x,y) corresponding to the arbitrary reference segment, as:

$$f(x, y) = \sum_{i=0}^{k1} \sum_{j=0}^{k2} a_{ij} x^i y^j$$

where $a_{ij}$ denotes the correction coefficient, and k1 and k2 denote the highest orders of x and y, respectively.

16. The apparatus of claim 15, wherein the light intensity of the vignetting center, which is used to calculate lens shading correction values of pixels corresponding to reference segments of reference white images corresponding to the Gr channel and the Gb channel is an average of a light intensity of a vignetting center in a reference white image of the Gr channel and a light intensity of a vignetting center in a reference white image of the Gb channel.

* * * * *